US010692056B1

United States Patent
Garner, IV et al.

(10) Patent No.: US 10,692,056 B1
(45) Date of Patent: Jun. 23, 2020

(54) SYSTEMS AND METHODS FOR DYNAMIC SAVINGS BASED ON ACTUAL USE FOR NETWORK ENABLED PROPERTIES

(71) Applicant: Wells Fargo Bank, N.A., San Francisco, CA (US)

(72) Inventors: Andrew J. Garner, IV, State Road, NC (US); Nick A. Maiorana, Charlotte, NC (US); Rajib Roy, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 834 days.

(21) Appl. No.: 14/980,230

(22) Filed: Dec. 28, 2015

(51) Int. Cl.
*G06Q 40/00* (2012.01)
*G06Q 20/10* (2012.01)
*H04L 29/08* (2006.01)
*H04L 12/24* (2006.01)
*G06Q 10/00* (2012.01)

(52) U.S. Cl.
CPC ............ *G06Q 20/10* (2013.01); *G06Q 10/20* (2013.01); *H04L 41/5029* (2013.01); *H04L 41/5035* (2013.01); *H04L 67/306* (2013.01)

(58) Field of Classification Search
CPC ..... G06Q 10/20; G06Q 20/10; H04L 41/5029
See application file for complete search history.

(56) References Cited

U.S. PATENT DOCUMENTS 6,554,183 B1 *  4/2003  Sticha ................ G06Q 10/0875
                                                      235/379
8,050,961 B2 *  11/2011  Matsubara ............. G06Q 10/06
                                                      705/7.38
9,288,270 B1 *  3/2016  Penilla .................. H04W 4/046
(Continued)

FOREIGN PATENT DOCUMENTS

JP            200330304      *  1/2003  ............. G06Q 10/10

OTHER PUBLICATIONS

Gita Faust, "Save for Future Repairs Using QuickBooks," published on the internet at https://fastracconsulting.com/blog/2011/10/12/save-for-future-repairs-using-quickbooks/ (2011) (Year: 2011).*

(Continued)

*Primary Examiner* — Alexander G Kalinowski
*Assistant Examiner* — William B. Bunker
(74) *Attorney, Agent, or Firm* — Foley & Lardner LLP (57) ABSTRACT

Systems and methods of automatically adjusting a transfer amount to an account on a financial institution computer system associated with a network enabled property from one or more accounts associated with users of the property are described. The methods can include creating a first account on the financial institution computer system with the account designated for maintenance, repair, or replacement of the network enabled property, receiving or identifying a designated amount of money to automatically transfer periodically to the account associated with the property from the one or more accounts associated with users of the property, and creating an automated periodic transfer between the accounts. After receiving data comprising amount of use by one or more users, the method may further include updating the amount of the automated periodic transfer based on at least the designated amount and the data comprising the amount of use by the users.

15 Claims, 5 Drawing Sheets

(56) References Cited

U.S. PATENT DOCUMENTS

| | | | | |
|---|---|---|---|---|
| 9,727,933 B1* | 8/2017 | Smith | ............... | G06Q 10/10 |
| 10,049,505 B1* | 8/2018 | Harvey | ............... | G07C 5/008 |
| 10,102,585 B1* | 10/2018 | Bryant | ............... | G06Q 50/16 |
| 10,282,711 B2* | 5/2019 | Chan | ............... | G06Q 50/08 |
| 2002/0082966 A1* | 6/2002 | O'Brien | ............... | G06Q 10/06 |
| | | | | 705/36 R |
| 2007/0112487 A1* | 5/2007 | Avery | ............... | G06Q 10/06 |
| | | | | 701/33.4 |
| 2008/0189182 A1* | 8/2008 | Price | ............... | G06Q 30/0239 |
| | | | | 705/14.39 |
| 2009/0106036 A1* | 4/2009 | Tamura | ............... | G06Q 10/109 |
| | | | | 705/305 |
| 2013/0325541 A1* | 12/2013 | Capriotti | ............... | G06Q 10/20 |
| | | | | 705/7.21 |
| 2014/0372289 A1* | 12/2014 | Doom | ............... | G06Q 10/20 |
| | | | | 705/39 |
| 2016/0189115 A1* | 6/2016 | Cattone | ............... | G06Q 10/20 |
| | | | | 705/26.8 |
| 2017/0046669 A1* | 2/2017 | Chow | ............... | G06Q 10/0631 |

OTHER PUBLICATIONS

Reserve Fund Definition—Investopedia; published on the internet at https://www.investopedia.com/terms/r/reservefund.asp; Nov. 13, 2015 as archived by www.archive.org (Year: 2015).*

Anonymous, "Inside the Internet of Things (IoT)," Deloitte University Press (Year: 2015).*

* cited by examiner

SYSTEMS AND METHODS FOR DYNAMIC SAVINGS BASED ON ACTUAL USE FOR NETWORK ENABLED PROPERTIES

BACKGROUND

Increasingly, devices and systems within people's homes, business environments, and public infrastructures are configured to self-monitor, gather data, and alert end users to potential malfunctions, supply outages, emergency conditions, and other situations in which end users may need to act. Such devices and systems are known generally as internet-of-things (IoT) devices. The IoT devices are electronic devices that gather data and communicate data over the Internet. For example, an IoT device may be a smart watch, an Internet-connected appliance, a smart thermostat, or the like. The data gathered by these IoT devices can be communicated over device-to-device communication channels (e.g., with other IoT devices), directly from IoT devices to end user devices, or from the IoT devices to backend systems associated with the IoT devices.

SUMMARY

One embodiment relates to a method of automatically adjusting a transfer amount to an account on a financial institution computer system associated with a network enabled property from one or more accounts associated with users of the network enabled property. The method includes creating a first account on the financial institution computer system with the account designated for maintenance, repair, or replacement of the network enabled property, receiving or identifying a designated amount of money to automatically transfer periodically to the account associated with a network enabled property from the one or more accounts associated with users of the network enabled property, and creating an automated periodic transfer between the accounts. After receiving data comprising amount of use by the one or more users from the network enabled property, the method further includes updating the automated periodic transfer to use an adjusted amount, the adjusted amount based on at least the designated amount and the data comprising the amount of use by the one or more users.

Another embodiment may further comprise receiving manufacturer data relevant to the one or more network enabled properties. The data includes at least data correlating an amount of use until there is a recommended replacement, maintenance, or repair of the network enabled property. The method than includes comparing the data comprising the amount of actual use of the network enabled property to the amount of use until there is a recommended replacement, maintenance, or repair. The adjusted amount is calculated based on the comparison to the manufacturer data and the time period of the automated periodic transfer.

Another embodiment relates to a system for using usage information provided by network enabled properties, where the system comprises a network interface, a network enabled properties database configured to store maintenance, repair, and/or replacement information on one or more network enabled properties, and at least one processor. The at least one processor is configured to create a first account designated for maintenance, repair, or replacement of the one or more network enabled properties, receive a designated amount to automatically transfer periodically to the account from a second account, create an automated periodic transfer to the first account from the second account of the designated amount, receive data comprising amount of use from the one or more network enabled properties and storing in the network enabled properties database, and update the automated periodic transfer to use an adjusted amount, the adjusted amount based on at least the designated amount and the data comprising amount of use from the one or more network enabled properties.

Another embodiment relates to a system for using usage information provided by network enabled properties, where the system comprises a network interface, a network enabled properties database configured to store maintenance, repair, and/or replacement information on one or more network enabled properties, and at least one processor. The at least one processor is configured to create a first account designated for maintenance, repair, or replacement of the one or more network enabled properties, receive a designated amount to automatically transfer periodically to the account from a second account, create an automated periodic transfer to the first account from the second account of the designated amount, receive data comprising amount of use from the one or more network enabled properties and storing in the network enabled properties database, and update the automated periodic transfer to use an adjusted amount, the adjusted amount based on at least the designated amount and the data comprising amount of use from the one or more network enabled properties.

Another embodiment relates to a non-transitory computer-readable media having computer-executable instructions stored therein, the instructions when executed by one or more processors of a computer system causes the computer system to perform a process. The process performed by the computer system includes creating a first account, using the financial institution computer system, the account designated for maintenance, repair, or replacement of one or more network enabled properties, receiving, by the financial institution computer system, a designated amount to automatically transfer periodically to the account from a second account, creating an automated periodic transfer to the first account from the second account of the designated amount, receiving data comprising amount of use from the one or more network enabled properties, and updating the automated periodic transfer to use an adjusted amount, the adjusted amount based on at least the designated amount and the data comprising amount of use from the one or more network enabled properties.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, systems and methods for dynamic savings based on actual use for network enabled properties are described. Network enabled properties can be consumer electronic devices, vehicles, real property, or other properties capable of monitoring property use and communicating property use data over a network. In some arrangements, the network enabled properties communicate with a financial institution computing system to send data relating to the network enabled property. The data relating to the network enabled property can include use information, malfunction information, expected life information, usage trends, warranty information, part life information, service information, and the like. In some arrangements, the financial institution computing systems further communicate over a network to computing systems of the manufacturers of the network enabled properties when the properties are consumer electronic devices or vehicles in order to receive additional data about the network enabled properties.

Figure 1:
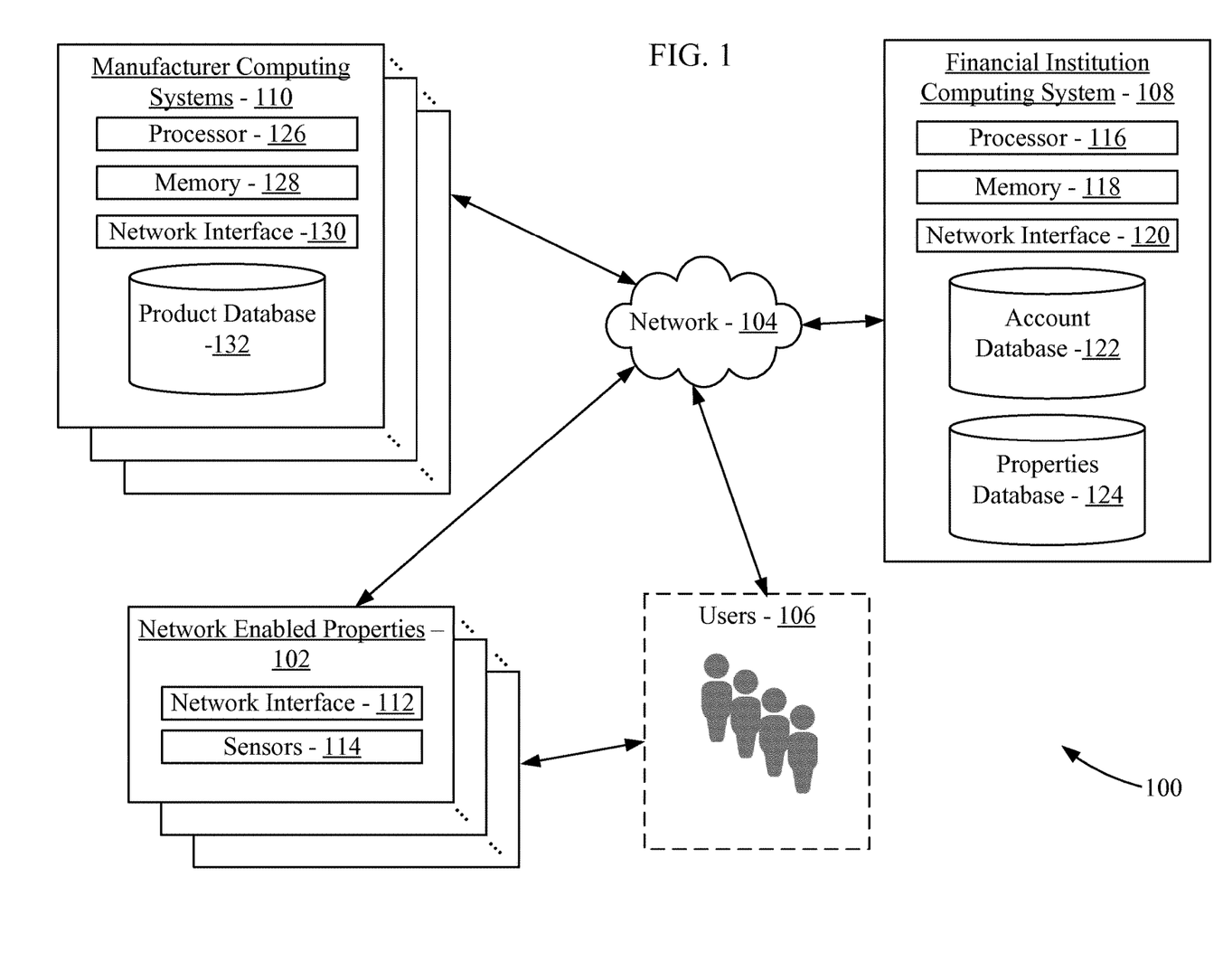
FIG. 1 is a block diagram of a system for dynamic savings based on actual use of network enabled properties shown according to an example embodiment.

Referring now to FIG. 1, an embodiment of an environment 100 is depicted. In brief overview, the environment 100 comprises one or more network enabled properties 102 connected to a network 104. The network enabled properties 102 are used by one or more users 106. Also connected to the network 104 are a financial institution computing system 108 and one or more manufacturer computing systems 110. In some arrangements, the users 106 communicate over the network 104 to the network enabled properties 102 and to the financial institution computing system 108 via user devices, such as smartphones, laptop computers, desktop computers, tablet computers, and the like. In some arrangements, the financial institution computing system 108 communicates to the users 106, the network enabled properties 102, and the manufacturer computing systems 110 over the network 104. In reference to components described herein, references to the components in singular or in plural form are not intended as disclaimers of alternative arrangements unless otherwise indicated. The components are configured to interact, in some arrangements, as described in further detail below.

The network enabled properties 102 contain at least a network interface 112 and at least one sensor 114. In some arrangements, the network interface 112 includes the hardware and logic necessary to communicate over multiple channels of data communication. For example, the network interface 112 may include a Wi-Fi interface, a cellular modem, a Bluetooth transceiver, a Bluetooth beacon, an RFID transceiver, an NFC transceiver, or a combination thereof. The network interface 112 facilitates data communication to and from the network enabled property 102. In some arrangements, data passing through the network interface 112 is encrypted such that the network communication is secure. The at least one sensor 114 may include physical sensors as well as data gathering modules or devices that can monitor the amount of use of the network enabled property 102. In some arrangements, the sensors include one or more of power monitoring sensors, network usage sensors, biometric sensors, gyroscopic sensors, environment sensors, cameras, microphones, thermometers, etc. In some arrangements, the network enabled property 102 is a vehicle and the network interface 112 and the at least one sensor 114 are also associated with the general operation of the vehicle itself (e.g., sensors relating to the infotainment system, sensors relating to the engine, sensors relating to the battery, etc.). For example, when the network enabled property is a vehicle, the sensors can monitor ignition status, speed, braking strength, acceleration, service work performed, etc.

In other arrangements, the network enabled property 102 is a real property (e.g., a home, a condo, a timeshare, a business location, etc.) and the network interface 112 and the at least one sensor 114 and the other components of the network enabled property 102 may reside in or be integrated into different areas of the real property in relation to other components. In further arrangements, the network enabled property 102 is a consumer appliance (e.g. a refrigerator, a freezer, a stove, a washing machine, a dryer, a dishwasher, a heating system, an air conditioner, etc.) and the consumer appliance may have embedded or be electrically connected to at least one sensor 114. For example, when the network enabled property 102 is a consumer appliance such as a smart refrigerator, embedded sensors monitor frequency and duration of opening the doors, use of an integrated water dispenser, contents of the refrigerator, and use of an integrated ice dispenser. Biometric or proximity sensors detect the user of the consumer appliance or detect a user device associated with the user.

In further arrangements, the network enabled property 102 is a consumer electronic device (e.g. a television, a stereo, a security system, a camcorder, a digital video recorder, a printer, etc.) and the consumer electronic devices may have embedded or be electrically connected to at least one sensor 114. For example, when the network enabled property 102 is a consumer electronic device such as a multi-function printer capable of printing, scanning, faxing, embedded sensors monitor use by page count, printing quality used as well as black and white vs. color printing. Biometric or proximity sensors detect the user of the multi-function printer when the multi-function printer is used directly for scanning or faxing. Network user identifier components may detect the user of the multi-function printer accessing the printer over a network when using network functions.

In the environment 100, data communication between the network enabled properties 102, the users 106, the financial institution computing system 108, and the manufacturer computing systems 110 in various combinations may be facilitated by the network 104. In some arrangements, the network 104 includes the internet. In other arrangements or combinations, the network 104 includes a local area network or a wide area network. The network 104 may be facilitated by short and/or long range communication technologies including Bluetooth transceivers, Bluetooth beacons, RFID transceivers, NFC transceivers, Wi-Fi transceivers, cellular transceivers, wired network connections, etc.

Still referring to FIG. 1, the users 106 may be in communication with and/or have accounts with the financial institution computing system 108. Users 106 may be individuals, companies, corporations, or other entities that use the network enabled properties 102 directly or indirectly. The financial institution computing system 108 is associated with a financial institution (e.g., a bank, a credit card issuer, etc.). The financial institution computing system 108 includes one or more processors 116, memory 118, a network interface 120, an account database 122, and a properties database 124. The memory 118 stores programming modules that, when executed by the one or more processors 116, control at least some operations of the financial institution computing system 108 using data stored in databases or other computer storage structures, such as the account database 122 and the properties database 124. Data passing through the network interface 120 may be encrypted such that the network interface 120 is a secure communication module. The account database 122 is configured to store information related to accounts associated with users 106, accounts associated with network enabled properties 102 and accounts associated with both users 106 and network enabled properties 102. The properties database 124 is configured to store information related to various network enabled properties 102 including specific usage information tied to particular network enabled properties 102 as well as other information (e.g., manufacturer information obtained from manufacturer computing systems 110, property ownership information, property account affiliations, etc.). In another arrangement, the one or more processors 116, memory 118, the network interface 120, the account database 122, and the properties database 124 reside in part on different servers in relation to other components or to the whole of a particular component.

The manufacturer computing systems 110 are configured to communicate information about products associated with a manufacturer associated with a given manufacturing computing system 110. The products, for example, include network enabled properties 102 manufactured, sold, or supported by the manufacturer. Each of the manufacturer computing systems 110 is associated with one or more manufacturers (e.g. manufacturers of consumer electronic devices, manufacturers of vehicles, etc.). Manufacturers as used herein may refer to actual manufacturers or may refer to technology companies or other product or vehicle companies that use contract manufacturers to do the actual manufacturing. The manufacturer computing systems 110 include one or more processors 126, one or more memories 128, a network interface 130, and a product database 132. The memory 128 stores programming modules that, when executed by the one or more processors 126, control some operations of the manufacturer computing system 110 using data stored in databases or other computer storage structures such as a product database 132. Data passing through the network interface 130 may be encrypted such that the network interface 130 is a secure communication module. The product database 122 is configured to store information related to products or devices manufactured by the manufacturer(s) (e.g., information relating to the network enabled properties 102). The products or devices can be consumer electronic devices, industrial electronic devices, vehicles, and other products or devices that can be monitored for usage information, wherein the usage of the product affects one of a service life, maintenance schedule, replacement schedule, or replacement of consumables within the product or device. In another arrangement, the one or more processors 126, memory 128, a network interface 130, and a product database 132 reside in part on different servers in relation to other components or to the whole of a particular component.

Figure 2:
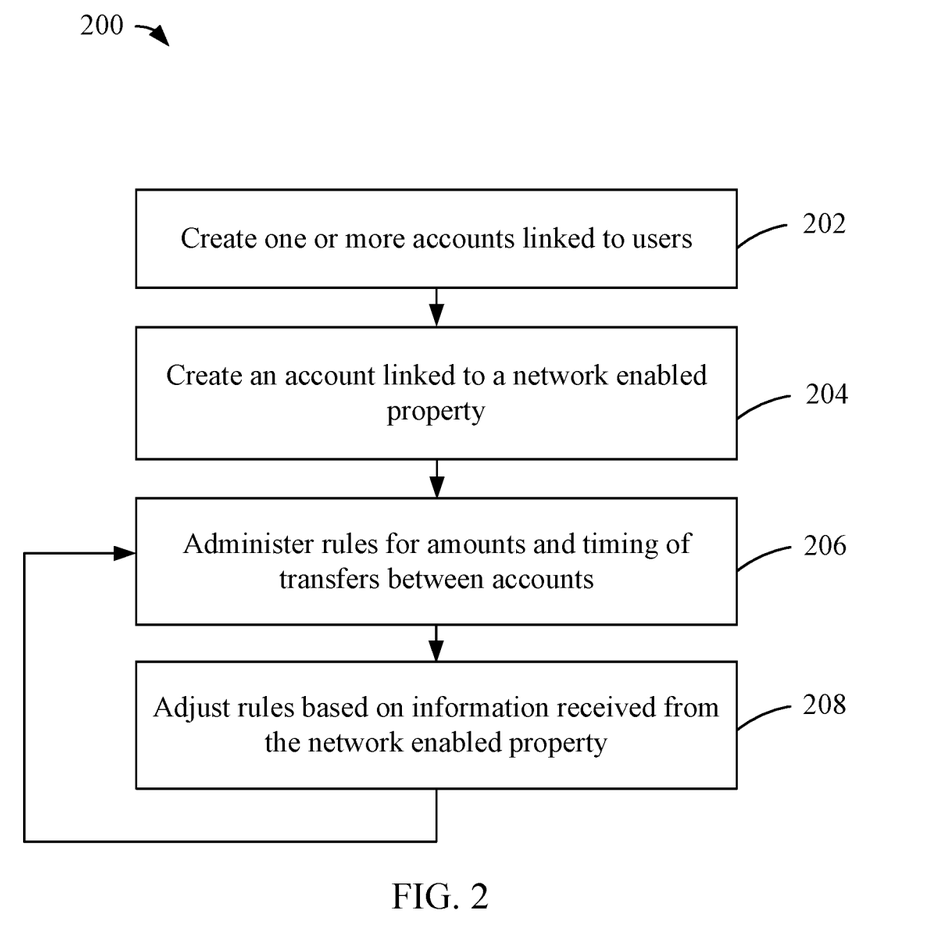
FIG. 2 is a flow diagram of a method of dynamic rebalancing of transfers from user accounts to accounts linked to one or more network enabled properties shown according to an example embodiment.

Referring now to FIG. 2, a flow diagram of a method 200 of dynamic rebalancing of transfers from user accounts to accounts linked to one or more network enabled properties 102 is shown according to an example embodiment. The method 200 is performed by the financial institution computing system 108 (e.g., by the processor 116). While performing the method 200, the financial institution computing system 108 communicates data over a network interface 120 over the network 104 from a network interface 112 of one or more network enabled properties 102. The method 200 begins when an account 122 in a financial institution computing system 108 is created and linked or associated with users 106 at 202. The account 122 is created by or for the benefit of the one or more users 106. The account 122 is set up with the bank or other financial entity that runs the financial institution computing system 108 to store, deposit, and withdraw money or other financial instruments. The users 106 linked or associated with the account 122 have control over the depositing and/or withdrawing of any financial instruments from the account 122.

An account 122 in a financial institution is linked or associated with one or more network enabled properties 102 at 204. The account 122 is created by or for the benefit of one or more users 106, the one or more users 106 benefiting from the use of one or more network enabled properties 102. The account 122 is set up with the bank or other financial entity that runs the financial institution computing system 108 to store, deposit, and/or withdraw money and other financial instruments. The account is linked or associated with one or more network enabled properties 102 from which the one or more users 106 are receiving use or benefit. In some arrangements, the link or association with the one or more network enabled properties 102 to the one or more accounts allows or gives authorization for the network enabled properties 102 to pass data or information, including usage information, to be sent to the financial institution computing system 108. In some arrangements, one or more users 106 have one or more accounts 122 respectively, each for the sole use and benefit of the one or more users 106 respectively. Each of the one or more accounts 122 of the respective users may be linked to one or more accounts 122 linked to one or more network enabled properties 102 respectively.

Rules are administered setting timing of withdrawals as well as withdrawal amounts from one or more user accounts 122 to one or more accounts 122 linked to a network enabled property 102 at 206. The amounts withdrawn are deposited into accounts 122 linked to one or more network enabled properties 102. The rules are administered and set using usage data supplied by the one or more network enabled properties 102 to the financial institution computing system 108. In some arrangements, usage and other data supplied by the one or more network enabled properties are stored by the financial institution computing system 108 in order to administer any rules. In one example of administering rules, the withdrawal amounts from accounts 122 linked to one or more users 106 and deposited in an account linked to a network enabled property 102 are equal to the replacement cost of the network enabled property 102 over the amount of time equal to the expected life of the network enabled property 102. In another example of administering rules, the withdrawal amounts are equal to an amount or estimated amount of the cost of maintenance of the network enabled property 102 over the amount of time matching a maintenance schedule of the network enabled property 102. In another example of administering rules, the withdrawal amounts are equal to an amount or an estimated amount for repair costs of the network enabled property 102 over the amount of time that is estimated for the network enabled property 102 requiring repair. In some arrangements, information is obtained from the network enabled property 102 and the information provides estimated time for maintenance, repair, and/or replacement. Adjustment of the amount of time before an estimated time for maintenance, repair, or replacement requires a positive or negative adjustment of the withdrawal amount to account for the cost of maintenance repair, or replacement within the newly adjusted time period. More than one rule can be administered, such that the withdrawal amounts and times account for two or more of maintenance, repair, replacement, or other schedules based on usage, life expectancy, user set replacement schedules or the like. One or more rules can also be set for consumables used by the network enabled property 102, such as fuel.

Finally, the rules are adjusted in order to dynamically rebalance the withdrawal amounts and/or the timing of the withdrawals based on supplied information, the information supplied at least in part by the network enabled property 102 at 208. The information comprises estimated or actual usage by one or more users 106 of the network enabled property 102 linked to an account 122. In some arrangements, information is obtained from the network enabled property 102 and comprises actual usage of the network enabled property 102. The information may be provided periodically, e.g., daily, weekly, monthly basis, etc., or provided when requested by the financial institution computing system 108 over the network 104. The usage information can be provided for each identified user 106 of the network enabled property 102. Usage information from multiple users 106 can be used to dynamically rebalance the withdrawn amount from each of their respective accounts 122 for the amounts to correspond to a percentage of usage of the network enabled property 102. Adjustment of the amount of time before an estimated time for maintenance, repair, or replacement requires a positive or negative adjustment of the withdrawal amount to account for the cost of maintenance repair, or replacement within the newly adjusted time period. More than one rule can be administered, such that the withdrawal amounts and times account for two or more of maintenance, repair, replacement, or other schedules based on usage, life expectancy, user set replacement schedules or the like. In some arrangements, a threshold can be set where the amount needed for repair exceeds the threshold and triggers a change in withdrawal amounts to account for an anticipated replacement. In other arrangements, a usage threshold may trigger a change in withdrawal amounts to account for an anticipated replacement. In some arrangements, a dashboard can be provided that allows a status view for each of the one or more network enabled properties 102.

Figure 3:
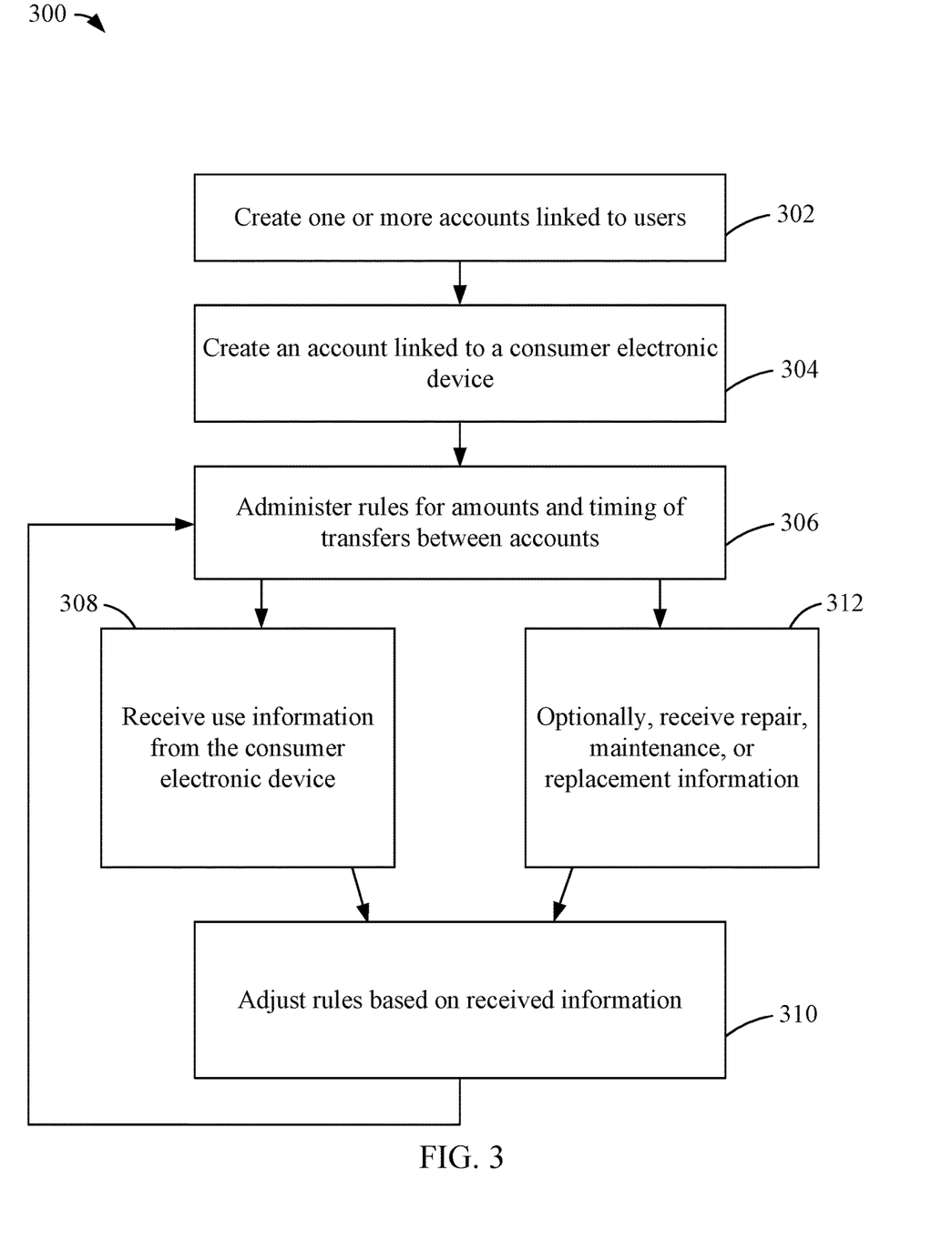
FIG. 3 is a flow diagram of a method of transferring periodic transfers of financial instruments to accounts linked to consumer electronic devices based at least on expected lifetime and/or amount of use by one or more users shown according to an example embodiment.

Referring now to FIG. 3, a flow diagram of a method 300 of transferring periodic transfers of financial instruments to accounts linked to consumer electronic devices based at least on expected lifetime and/or amount of use by one or more users is shown according to an example embodiment. The method 300 is performed by the financial institution computing system 108 (e.g., by the processor 116). While performing the method 300, the financial institution computing system 108 communicates data over the network interface 120 over the network 104 from a network interface 112 of one or more network enabled properties 102 and optionally communicates data over a network interface 120 over the network 104 from a network interface 130 of one or more manufacturer computing systems 110. An account 122 in a financial institution computing system 108 is created and linked or associated with users 106 at 302. The account 122 is created by or for the benefit of one or more users 106. The account 122 is set up with the bank or other financial entity that runs the financial institution computing system 108 to store, deposit, and/or withdraw money or other financial instruments. The users 106 linked or associated with the account 122 have control over the depositing and/or withdrawing of any financial instruments from the one or more accounts 122.

An account 122 in a financial institution computing system 108 is created and linked or associated with one or more consumer electronic devices at 304. The account 122 is created by or for the benefit of one or more users 106, the one or more users 106 benefiting from the use of one or more network enabled properties 102, the network enabled properties being consumer electronic devices. The account 122 is set up with the bank or other financial entity that runs the financial institution computing system 108 to store, deposit, and/or withdraw money and other financial instruments. The account 122 is linked or associated with the one or more consumer electronic devices from which the one or more users 106 are receiving use or benefit. In some arrangements, the link or association with the one or more consumer electronic devices to the account 122 allows or gives authorization for the network enabled properties 102 to pass data or information, including usage information, to be sent to the financial institution computing system 108. In some arrangements, one or more users 106 have one or more accounts 122 respectively, each for the sole use and benefit of the one or more users 106 respectively. Each of the one or more accounts 122 of the respective users may be linked to one or more accounts 122 linked to one or more network enabled properties 102 respectively.

Rules are administered setting the timing of and withdrawal amounts from user accounts 122 to the account 122 linked or associated with the consumer electronic device at 306. The amounts withdrawn are deposited into accounts 122 linked to one or more consumer electronic devices. The rules are administered and set using usage data supplied by the one or more consumer electronic devices to the financial institution computing system 108. In some arrangements, usage and other data supplied by the one or more network enabled properties are stored by the financial institution computing system 108 in order to administer any rules. In one example of administering rules, the withdrawal amounts from accounts 122 linked to one or more users 106 and deposited in an account linked to a consumer electronic device are equal to the replacement cost of the consumer electronic device over the amount of withdrawal time periods equal to the expected life of the consumer electronic device. In a specific example, a home treadmill machine has an expected life of ten years and the accounts 122 linked to two users 106 respectively both have a set monthly withdrawal amount equal to the expected cost of a replacement treadmill machine divided by one-hundred and twenty months, further divided by two users.

In another example of administering rules a 306, the withdrawal amounts are equal to an amount or estimated amount of the cost of maintenance of the consumer electronic device over the amount of time matching a maintenance schedule of the consumer electronic device. Returning to the home treadmill example of administering rules as a specific example, a home treadmill machine may have a maintenance schedule requiring replacement of the belt every two years and the accounts linked to two users 106 of the treadmill both have a set monthly withdrawal amount equal to the expected cost of a replacement belt including replacement service cost divided by 24 months, further divided by two users 106. Rules can be combined, for example having both the withdrawal amounts for maintenance as well as replacement taken from the two accounts linked to two users 106.

In another example of administering rules at 306, the withdrawal amounts are equal to an amount or estimated amount of the cost of repair of the consumer electronic device over the as provided by an estimated repair amount per month or other withdrawal time period. Returning to the home treadmill example of administering rules as a specific example, a home treadmill may have an estimated average amount of $50 worth of repair work each month and the accounts linked to two users 106 of the treadmill both have a set monthly withdrawal amount equal $25 per month to add to an account set aside for repair costs to the treadmill. This rule can further be combined with the examples for withdrawal amounts for maintenance as well as replacement taken from the two accounts linked to two users 106.

Information is obtained or received on an amount of use of the consumer electronic device(s) by the users 106, the information supplied at least in part by the consumer electronic device(s) at 308. In some arrangements, the information is supplied at least in part by the consumer electronic device(s) through a network connection.

In some arrangements, the amounts of financial instruments being transferred periodically are adjusted based at least on the expected lifetime of the consumer electronic device as well as the amount of actual use from one or more user 106 accounts 122 linked or associated with the consumer electronic device at 310. The information received may be in part at least the information supplied by the consumer electronic device at 308 of actual usage of the device by one or more users 106. Usage information from multiple users 106 can be used to dynamically rebalance the withdrawn amount from each of their respective accounts 122 for the amounts to correspond to a percentage of usage of the consumer electronic device from an amount of total usage by all users 106. Adjustment of the amount of time before an estimated time for maintenance, repair, or replacement requires a positive or negative adjustment of the withdrawal amount to account for the cost of maintenance repair, or replacement within the newly adjusted time period. More than one rule can be administered, such that the withdrawal amounts and times account for two or more of maintenance, repair, replacement, or other schedules based on usage, life expectancy, user set replacement schedules or the like. In one example of dynamically rebalancing the withdrawn amount from one or more users 106, users 106 may share the use of a consumer electronic device, each user 106 has a withdrawal amount deducted from an account linked to the respective user and deposited in an account linked to the consumer electronic device. The withdrawal amounts are equal for each respective user when the consumer electronic device is first obtained and the amounts are based on an estimated monthly amount required for maintenance, repair, and/or replacement at the expected end of life of the consumer electronic device. The expected repair cost and replacement at end of life may incorporate a statistical model of unexpected breakdowns associated with the consumer electronic device. Continuing the example, after a designated time period of one month, the consumer electronic device has sent usage information for each of the users to the financial institution computing device and the withdrawal amounts for each user are adjusted according the percentage of actual use by each user out of the total amount of use, the adjusted withdrawal amounts still adding up to the same total monthly withdrawal amounts from all user accounts.

Finally, additional information is optionally obtained from a product database 132 in a manufacturer computing system 110, the information at least comprising information on repair, maintenance, or replacement requirements based on use at 312. Combined with the amount of actual use by one or more users 106 of the consumer electronic device, additional information from the manufacturer on how amount of use affects recommended requirements for repair, maintenance, or replacement is further used to adjust the withdrawal amounts from accounts associated with the one or more users 106. Expanding on an earlier example, the consumer electronic device has sent usage information for each of the users to the financial institution computing system 108. The financial institution computing system 108 also receives information from the product database of a manufacturer computing system 110 associated with the consumer electronic device about total amount of use before needing repair, maintenance, or replacement of the consumer electronic device. The withdrawal amounts are adjusted equally for each user 106, independent of their percentage of total use, to adjust to a new time period for needing repair, maintenance, or replacement, based on the actual total usage thus far. In another example, the withdrawal amounts are not adjust equally but take into account the percentage of use of each individual user as well as the additional information received from the manufacturer computing system 110.

Figure 4:
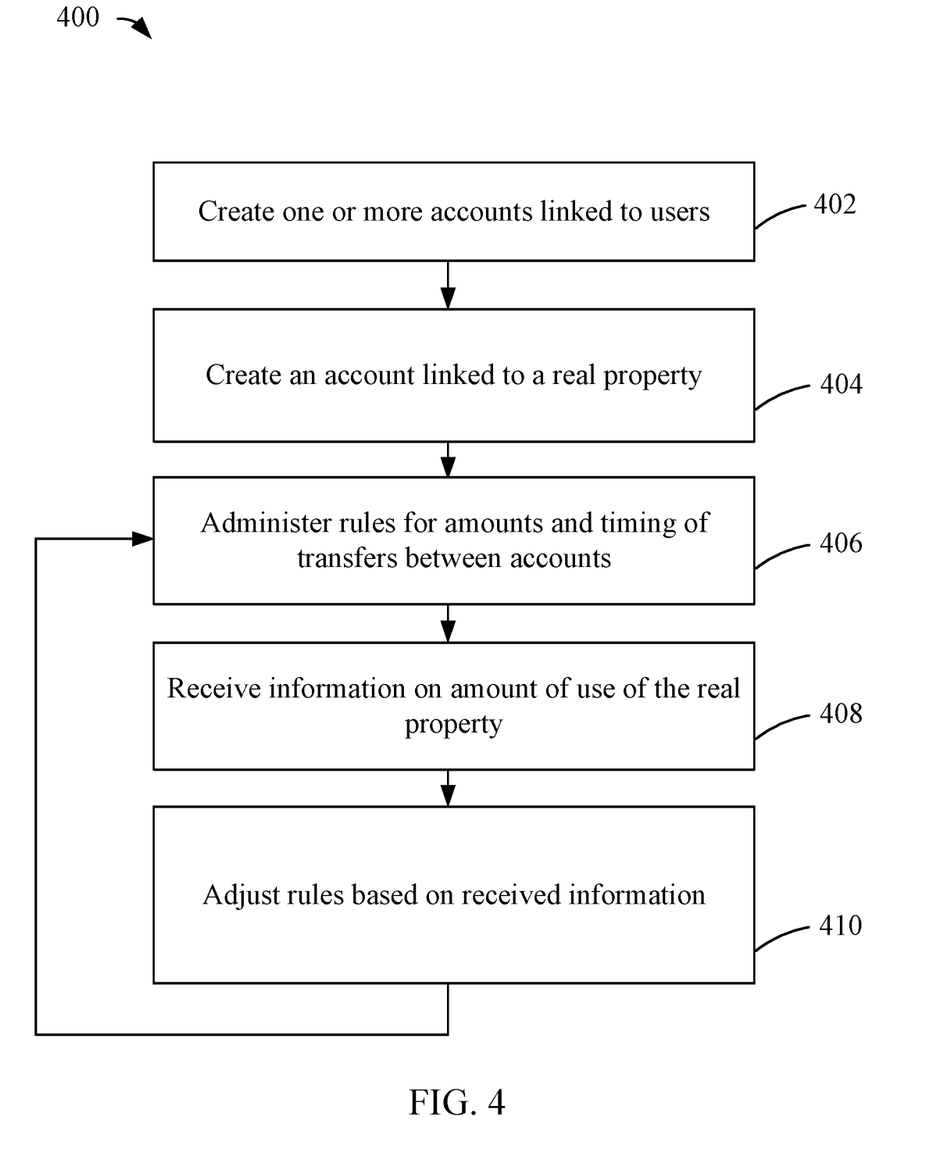
FIG. 4 is a flow diagram of a method of transferring periodic transfers of financial instruments to accounts linked to real properties based at least on amount of use by one more users shown according to an example embodiment.

Referring now to FIG. 4, a flow diagram of a method 400 of transferring periodic transfers of financial instruments to accounts linked to real properties based at least on amount of use by one or more users is shown according to an example embodiment. The method 400 is performed by the financial institution computing system 108 (e.g., by the processor 116). While performing the method 400, the financial institution computing system 108 communicates data over a network interface 120 over the network 104 from a network interface 112 of one or more network enabled properties 102. An account 122 in a financial institution computing system 108 is created and linked or associated with users 106 at 402. The account 122 is created by or for the benefit of one or more users 106. The account 122 is set up with the bank or other financial entity that runs the financial institution computing system 108 to store, deposit, and/or withdraw money or other financial instruments. The users 106 linked or associated with the account 122 have control over the depositing and/or withdrawing of any financial instruments from the account 122.

An account 122 in a financial institution computing system 108 is created and linked or associated with one or more real properties at 404. The account 122 is created by or for the benefit of one or more users 106, the one or more users 106 benefiting from the use of the one or more real properties. The account 122 is set up with the bank or other financial entity that runs the financial institution computing system 108 to store, deposit, and/or withdraw money and other financial instruments. The account 122 is linked or associated with the one or more real properties from which the one or more owners and/or users 106 are receiving use or benefit. In some arrangements, the link or association with the one or more real properties to the one or more accounts allows or gives authorization for any sensor(s) 114 or other usage detection methods to pass data or information, including usage information, to be sent to the financial institution computing system 108. In some arrangements, one or more users 106 have one or more accounts 122 respectively, each for the sole use and benefit of the one or more users 106 respectively. Each of the one or more accounts 122 of the respective users may be linked to one or more accounts 122 linked to one or more network enabled properties 102 respectively.

Rules are administered setting the timing of and withdrawal amounts from user accounts 122 to the account 122 linked or associated with the real property at 406. The amounts withdrawn are deposited into accounts 122 linked to one or more real properties. The rules are administered and set using usage data supplied by the one or more real properties to the financial institution computing system 108. In some arrangements, usage and other data supplied by the one or more real properties are stored by the financial institution computing system 108 in order to administer any rules. In one example of administering rules, the withdrawal amounts from accounts 122 linked to one or more users 106 and deposited in an account linked to a real property are equal to expected maintenance costs associated with the real property over the amount of withdrawal time periods equal to the expected length of time before needing the respective maintenance costs. In another example, the withdrawal amounts from accounts 122 linked to one or more users 106 and deposited in an account linked to a real property are equal to replacement costs of fixtures or appliances inextricably connected with the real property. In a specific example, the heating system of a real property, has a yearly maintenance schedule requiring a service call and the accounts linked to three users 106 of the real property have a set monthly withdrawal amount equal to the expected cost of the service call divided by 12 months, further divided by three users.

In another example of administering rules at 406, the withdrawal amounts are equal to an amount or estimated amount of the cost of replacement of a roof of a real property after an estimated 15 year life. The accounts linked to three users 106 of the real property have a set monthly withdrawal amount equal to the expected cost of replacing the roof divided by 180 months, further divided by three users 106. Rules can be combined, for example having both the withdrawal amounts for maintenance of features of the real property and replacement of the same or other features taken from the three accounts linked to the three users 106 of the real property.

Information is obtained or received on an amount of use of the one or more real properties by the users 106, the information supplied at least in part by at least one sensor 114 and a network interface 112 associated with the one or more real properties at 408. In some arrangements, the information is supplied at least in part by sensors or other usage detecting devices integrated into the real property or integrated in other electronic devices located in the real property through a network connection. Usage data of the real property may be obtained by a sensor directly, e.g., biometric sensors integrated in the real property, or through communication with a personal electronic device carried by the users.

Finally, periodic transfers of financial instruments occur based at least on the percentage of use of the real property from one or more user 106 accounts 122 to an account 122 linked or associated with the real property at 410. The information received may be in part at least the information supplied by sensors 114 or other devices embedded in the real property and used at 408 for determining actual usage of the real property by one or more users 106. Usage information from multiple users 106 can be used to dynamically rebalance the withdrawn amount from each of their respective accounts 122 for the amounts to correspond to a percentage of usage of the real property from an amount of total usage by all users 106. Adjustment of the amount of time before an estimated time for maintenance, repair, or component replacement requires a positive or negative adjustment of the withdrawal amount to account for the cost of maintenance repair, or replacement within the newly adjusted time period. More than one rule can be administered, such that the withdrawal amounts and times account for two or more of maintenance, repair, replacement, or other schedules based on usage, life expectancy, user set replacement schedules or the like. In one example of dynamically rebalancing the withdrawn amount from one or more users 106, users 106 may share the use of a real property, each user 106 has a withdrawal amount deducted from an account linked to the respective user and deposited in an account linked to the real property. The withdrawal amounts may be equal for each respective user when first established for the real property with the amounts are based on an estimated monthly amount required for maintenance, repair, and/or replacement indefinitely or over a set period of time for the real property. Continuing the example, after a designated time period of one month, sensors 114 or other devices detecting user 106 usage has sent usage information for each of the users to the financial institution computing device and the withdrawal amounts for each user are adjusted according the percentage of actual use by each user out of the total amount of use, the adjusted withdrawal amounts still adding up to the same total monthly withdrawal amounts from all user accounts.

In another example, the real property has sent usage information through detection by sensors and other devices for each of the users to the financial institution computing system 108. The financial institution computing system 108 also receives information from the product database of a manufacturer computing system 110 of a consumer electronic device that is a component of the real property about total amount of use before needing repair, maintenance, or replacement of the consumer electronic device. The withdrawal amounts are adjusted equally for each user 106, independent of their percentage of total use, to adjust to a new time period for needing repair, maintenance, or replacement, based on the actual total usage thus far. In another example, an amalgamation all electronic consumer electronic devices can be used to adjust the withdrawal amount for each user associated with a real property with each consumer electronic device creating an adjustment of the user amounts using method 400 for a total adjustment of withdrawal amounts for each user associated with a real property.

Figure 5:
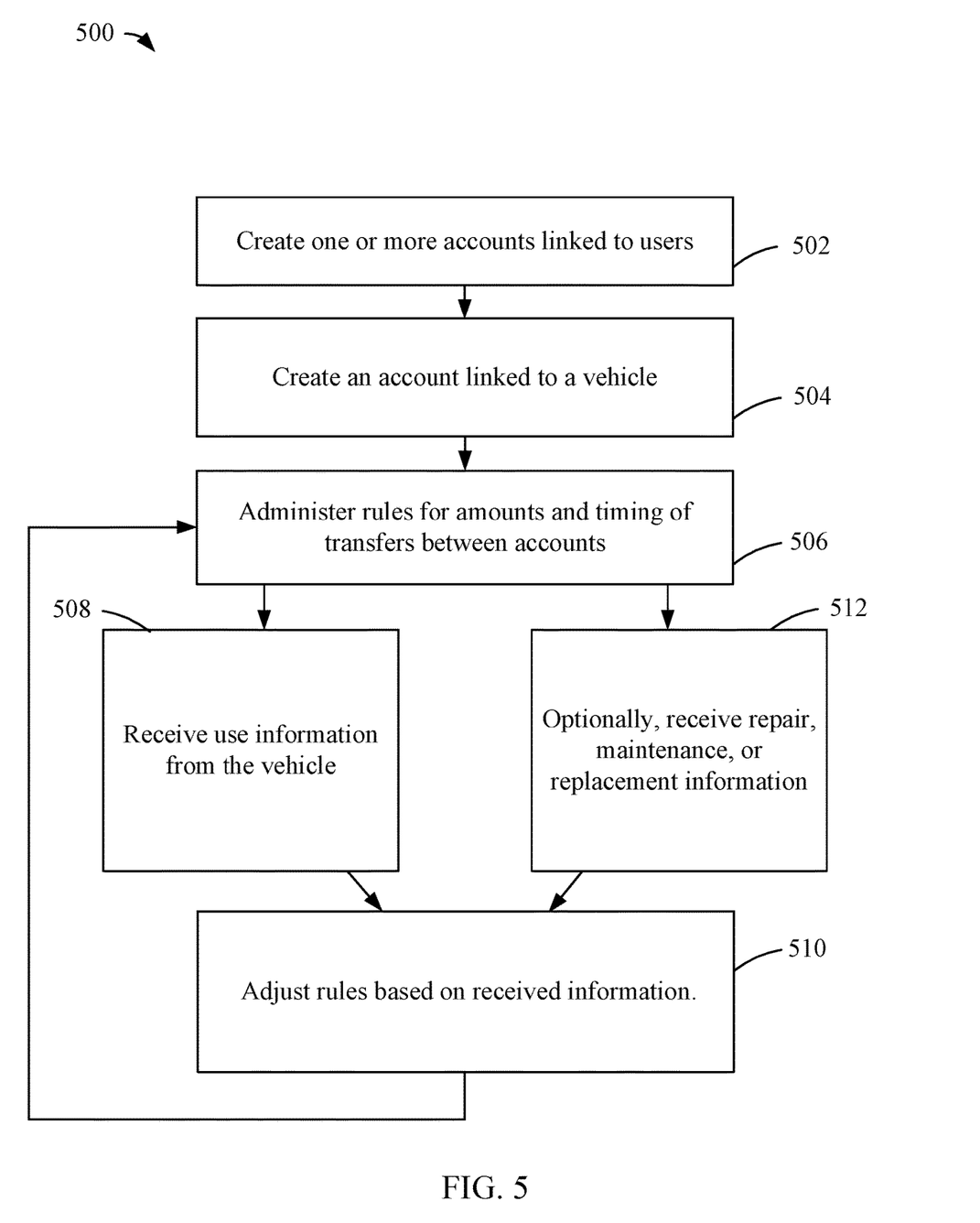
FIG. 5 is a flow diagram of a method of transferring periodic transfers of financial instruments to accounts linked to vehicles based at least on expected lifetime and/or amount of use by one or more users shown according to an example embodiment.

Referring now to FIG. 5, a flow diagram of a method 500 of transferring periodic transfers of financial instruments to an account 122 linked to one or more vehicles based at least on expected lifetime and/or amount of use by one or more users is shown according to an example embodiment. The method 500 is performed by the financial institution computing system 108 (e.g., by the processor 116). While performing the method 500, the financial institution computing system 108 communicates data over a network interface 120 over the network 104 from a network interface 112 of one or more network enabled properties 102 and optionally communicates data over a network interface 120 over the network 104 from a network interface 130 of one or more vehicle manufacturer computing systems 110. The account 122 in a financial institution computing system 108 is created and linked or associated with users 106 at 502. The account 122 is created by or for the benefit of one or more users 106. The account 122 is set up with the bank or other financial entity that runs the financial institution computing system 108 to store, deposit, and/or withdraw money or other financial instruments. The users 106 linked or associated with the account 122 have control over the depositing and/or withdrawing of any financial instruments from the account 122.

The account 122 in a financial institution computing system 108 is created and linked or associated with one or more vehicles at 504. The account 122 is created by or for the benefit of one or more users 106, the one or more users 106 benefiting from the use of one or more vehicles. The account 122 is set up with the bank or other financial entity that runs the financial institution computing system 108 to store, deposit, and/or withdraw money and other financial instruments. The account is linked or associated with the one or more vehicles from which the one or more users 106 are receiving use or benefit. In some arrangements, the link or association with the one or more vehicles to the account 122 allows or gives authorization for the vehicles to pass data or information, including usage information, to be sent to the financial institution computing system 108. In some arrangements, one or more users 106 have one or more accounts 122 respectively, each for the sole use and benefit of the one or more users 106 respectively. Each of the one or more accounts 122 of the respective users may be linked to one or more accounts 122 linked to one or more network enabled properties 102 respectively.

Rules are administered setting the timing of and withdrawal amounts from user accounts 122 to the account 122 linked or associated with the one or more vehicles at 506. The amounts withdrawn are deposited into accounts 122 linked to one or more vehicles. The rules are administered and set using usage data supplied by the one or more vehicles to the financial institution computing system 108. In some arrangements, usage and other data supplied by the one or more network enabled properties, in this case vehicles, are stored by the financial institution computing system 108 in order to administer any rules. In one example of administering rules, the withdrawal amounts from accounts 122 linked to one or more users 106 and deposited in an account linked to a vehicle are equal to the replacement cost of the vehicle over the amount of withdrawal time periods equal to the expected service life of the vehicle. In a specific example, a vehicle shared among two family members has an expected life of ten years and the accounts linked to two users 106, in this case the two family members, both have a set monthly withdrawal amount equal to the expected cost of replacing the vehicle divided by one-hundred and twenty months, further divided by two users 106.

In another example of administering rules at 506, the withdrawal amounts are equal to an amount or estimated amount of the cost of maintenance of the vehicle over the amount of time matching a recommended dealer maintenance schedule of the vehicle. In a specific example, two users of the vehicle have a set monthly withdrawal amount equal to the expected cost of following a recommended dealer maintenance schedule at a local dealer over a 10 month period. The average monthly cost of following such a schedule further divided by two users 106. Rules can be combined, for example having both the withdrawal amounts for maintenance and eventual replacement of the vehicle taken from the two accounts linked to two users 106.

In another example of administering rules at 506, the withdrawal amounts are equal to an amount or estimated amount of the cost of unexpected repairs of the vehicle as provided by an estimated repair amount per month or other withdrawal time period. In a specific example, a vehicle may have an estimated average amount of $100 worth of repair work each month and the accounts linked to two users 106 of the treadmill both have a set monthly withdrawal amount equal to $50 per month to add to an account set aside for repair costs to the vehicle. This rule can further be combined with the examples for withdrawal amounts for maintenance as well as replacement of specific vehicle components taken from the two accounts linked to two users 106.

Information is obtained or received on an amount of use of the one or more vehicles by the users 106, the information supplied at least in part by at least one sensor 114 and a network interface 112 associated with the one or more vehicles at 508. In some arrangements, the information is supplied at least in part by sensors or other devices in the vehicle through a network connection and sent to the financial institution computing system 108. In other arrangements, the information is first supplied and transmitted to a personal device of the user(s) 106 of the vehicle and then sent on to the financial institution computing system 108.

Finally, periodic transfers of financial instruments are transferred based at least on the expected lifetime of the vehicle as well as the amount of actual use from one or more user 106 accounts 122 linked or associated with the vehicle at 510. The information received may be in part at least the information supplied by one or more vehicles at 508 of actual usage of the vehicle(s) by one or more users 106. Usage information from multiple users 106 can be used to dynamically rebalance the withdrawn amount from each of their respective accounts 122 for the amounts to correspond to a percentage of usage of the vehicle from an amount of total usage by all users 106. Adjustment of the amount of time before an estimated time for maintenance, repair, or replacement requires a positive or negative adjustment of the withdrawal amount to account for the cost of maintenance repair, or replacement within the newly adjusted time period. More than one rule can be administered, such that the withdrawal amounts and times account for two or more of maintenance, repair, replacement, or other schedules based on usage, life expectancy, user set replacement schedules or the like. In one example of dynamically rebalancing the withdrawn amount from one or more users 106, users 106 may share the use of a vehicle, each user 106 has a withdrawal amount deducted from an account linked to the respective user and deposited in an account linked to the vehicle. The withdrawal amounts are equal for each respective user when the vehicle is first obtained or the vehicle use first tracked and the amounts are based on an estimated monthly amount required for maintenance, repair, and/or replacement at the expected end of life of the vehicle. The expected repair cost and replacement at end of life may incorporate a statistical model of unexpected breakdowns associated with the vehicle. Continuing the example, after a designated time period of perhaps one month, the vehicle has sent usage information for each of the users 106 to the financial institution computing system 108 and the withdrawal amounts for each user are adjusted according the percentage of actual use by each user out of the total amount of use, the adjusted withdrawal amounts still adding up to the same total monthly withdrawal amounts from all user accounts.

Additional information is optionally obtained from a product database 132 in a vehicle manufacturer computing system 110, the information at least comprising information on repair, maintenance, or part replacement requirements based on use at 512. Combined with the amount of actual use by one or more users 106 of the vehicle, additional information from the manufacturer on how amount of use affects recommended requirements for repair, maintenance, or replacement is further used to adjust the withdrawal amounts from accounts associated with the one or more users 106. Expanding on an earlier example, the vehicle has sent usage information for each of the users to the financial institution computing system 108. The financial institution computing system 108 also receives information from the product database of a manufacturer computing system 110 associated with the vehicle manufacturer about total amount of use before needing repair, maintenance, or replacement of the vehicle. The withdrawal amounts are adjusted equally for each user 106, independent of their percentage of total use, to adjust to a new time period for needing repair, maintenance, or replacement, based on the actual total usage thus far. In another example, the withdrawal amounts are not adjust equally but take into account the percentage of use of each individual user as well as the additional information received from the manufacturer computing system 110.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed:

1. A method of dynamically rebalancing a transfer amount payable to a maintenance account established on a financial institution computer system, the account associated with a network enabled property and established for the benefit of a plurality of users of the network enabled property, the method comprising:

creating, by the financial institution computer system, the maintenance account designated to pay for the cost of maintenance, repair, or replacement of the network enabled property, wherein the network enabled property comprises a network interface in electronic communication with the financial institution computing system and at least one sensor configured to determine usage information associated with the network enabled property;

receiving from a manufacturer computing system via the network manufacturer data relevant to the network enabled property;

based on the manufacturer data, determining a first usage-based adjustable maintenance schedule, wherein the first usage-based maintenance schedule is based on estimated usage of the network enabled property;

based on the first usage-based maintenance schedule, determining a total transfer amount periodically payable by the users to the maintenance account;

based on the first usage-based adjustable maintenance schedule and the total transfer amount, determining a first amount periodically payable by a first user of the network enabled property and a second amount periodically payable by a second user to maintain the network enabled property according to the first usage-based adjustable maintenance schedule;

creating an automated transfer to the maintenance account from a first account, associated with the first user, of the first amount and from a second account, associated with the second user, of the second amount; and periodically automatically adjusting the first adjustable maintenance schedule and the automated transfer, comprising:

receiving data, from the sensor, via the network interface of the network enabled property, the data comprising an amount of actual usage of the network enabled property, wherein the amount of actual usage comprises a first percentage of usage associated with the first user and a second percentage of usage associated with the second user; and based on the amount of actual usage of the network enabled property, determining a second adjustable maintenance schedule; and based on the second adjustable maintenance schedule, adjusting the total transfer amount by adjusting the first amount payable by the first user and the second amount payable by the second user based on the respective amount of actual usage by the first and second users, the adjusting comprising:

determining a new automated transfer amount based on an amount of time before an estimated time for maintenance according to the second adjustable maintenance schedule;

setting the first amount, payable by the first user, based on a first percentage of usage associated with the first user; and setting the second amount, payable by the second user, based on a second percentage of usage associated with the second user.

2. The method of claim 1, further comprising:

receiving manufacturer data relevant to the network enabled property comprising an amount of usage until recommended replacement; and comparing the data comprising amount of usage of the network enabled property to the amount of usage until recommended replacement.

3. The method of claim 1, wherein creating an automated transfer further comprises:

sending a request for a confirmation to create the automated transfer of the amount; and receiving the confirmation, the creation of the automated transfer contingent on receiving the confirmation.

4. The method of claim 1, wherein the manufacturer data further includes expected lifetime based on amount of usage of either the network enabled property or a component of the network enabled property.

5. The method of claim 1, further comprising:

receiving values for the plurality of amounts of money, each respective value linked to a respective user account; and creating a plurality of periodic transfers from each respective user account to the maintenance account, using the received values linked to each respective user account.

6. The method of claim 5, wherein at least one of the first amount and the second amount is calculated based at least on the comparison and a time period of the plurality of periodic transfers.

7. The method of claim 5, wherein adjusting the one of the plurality of periodic transfers further comprises:

receiving manufacturer data relevant to the network enabled property comprising an amount of usage until recommended replacement;

comparing the data comprising amount of usage of the network enabled property to the amount of usage until recommended replacement, wherein each respective updated value is calculated based at least on the comparison and a time period of the plurality of periodic transfers.

8. The method of claim 6, wherein the data received is the amount of usage of the network enabled property for one period of time of the plurality of periodic transfers.

9. The method of claim 5, wherein adjusting the one of the plurality of periodic transfers further comprises:

sending a request for a confirmation to adjust the one of the plurality of periodic transfers;

receiving the confirmation, the adjusting the one of the plurality of periodic transfers contingent on receiving the confirmation.

10. A system for dynamically rebalancing a transfer amount payable to a maintenance account on a financial institution computer system, the account associated with a network enabled property and established for the benefit of a plurality of users of the network enabled property, the system comprising:

a first network interface associated with the financial institution computer system;
a network enabled properties database configured to store maintenance, repair, or replacement information on a network enabled property; and
at least one processor configured to:
create the maintenance account designated to pay for the cost of maintenance, repair, or replacement of the network enabled property, wherein the network enabled property comprises a second network interface in electronic communication with the financial institution computing system and at least one sensor configured to determine usage information associated with the network enabled property;
receive from a manufacturer computing system via the network manufacturer data relevant to the network enabled property;
based on the manufacturer data, determine a first usage-based adjustable maintenance schedule, wherein the first usage-based maintenance schedule is based on estimated usage of the network enabled property;
based on the first usage-based maintenance schedule, determine a total transfer amount periodically payable by the users to the maintenance account;
based on the first usage-based adjustable maintenance schedule and the total transfer amount, determine a first amount periodically payable by a first user of the network enabled property and a second amount periodically payable by a second user to maintain the network enabled property according to the first usage-based adjustable maintenance schedule;
create an automated transfer to the maintenance account from a first account, associated with the first user, of the first amount and from a second account, associated with the second user, of the second amount; and
periodically automatically adjusting the first adjustable maintenance schedule and the automated transfer, comprising operations to:
 receive data, from the sensor, via the network interface of the network enabled property, the data comprising an amount of actual usage of the network enabled property, wherein the amount of actual usage comprises a first percentage of usage associated with the first user and a second percentage of usage associated with the second user; and
 based on the amount of actual usage of the network enabled property, determine a second adjustable maintenance schedule; and
 based on the second adjustable maintenance schedule, adjust the total transfer amount, comprising operations structured to adjust the first amount payable by the first user and the second amount payable by the second user based on the respective amount of actual usage by the first and second users, the operations to adjust further comprising operations structured to:
  determine a new automated transfer amount based on an amount of time before an estimated time for maintenance according to the second adjustable maintenance schedule;
  set the first amount, payable by the first user, based on a first percentage of usage associated with the first user; and
  set the second amount, payable by the second user, based on a second percentage of usage associated with the second user.

11. The system of claim 10, wherein the processor is further configured to:

receive manufacturer data relevant to the network enabled property comprising an amount of usage until recommended replacement; and
compare the data comprising amount of usage from the one or more network enabled property to the amount of usage until recommended replacement.

12. The system of claim 10, wherein the data comprises the amount of usage for one period of time of automated transfer.

13. The system of claim 10, wherein the processor is further configured to:
send a request for a confirmation to update the automated transfer to usage the first adjusted amount and the second adjusted amount; and
receive the confirmation, the updating the automated transfer contingent on receiving the confirmation.

14. The system of claim 10, wherein the manufacturer data further includes expected lifetime based on amount of usage of either the network enabled property or a component of the network enabled property.

15. A non-transitory computer-readable media having computer-executable instructions embodied therein that, when executed by one or more processors, of a computer system cause the computer system to perform a process for dynamically rebalancing a transfer amount payable to a maintenance account on a financial institution computer system, the account associated with a network enabled property and established for the benefit of a plurality of users of the network enabled property, the process performed by the computer system including:
creating, using the financial institution computer system, the maintenance account designated to pay for the cost of maintenance, repair, or replacement of the network enabled property, wherein the network enabled property comprises a network interface in electronic communication with the financial institution computing system and at least one sensor configured to determine usage information associated with the network enabled property;
receiving from a manufacturer computing system via the network manufacturer data relevant to the network enabled property;
based on the manufacturer data, determining a first usage-based adjustable maintenance schedule, wherein the first usage-based maintenance schedule is based on estimated usage of the network enabled property;
based on the first usage-based maintenance schedule, determining a total transfer amount periodically payable by the users to the maintenance account;
based on the first usage-based adjustable maintenance schedule and the total transfer amount, determining a first amount periodically payable by a first user of the network enabled property and a second amount periodically payable by a second user to maintain the network enabled property according to the first usage-based adjustable maintenance schedule;
creating an automated transfer to the maintenance account from a first account, associated with the first user, of the first amount and from a second account, associated with the second user, of the second amount; and
periodically automatically adjusting the first adjustable maintenance schedule and the automated transfer, comprising:
 receiving data, from the sensor, via the network interface of the network enabled property, the data comprising an amount of actual usage of the network enabled property, wherein the amount of actual usage comprises a first percentage of usage associated with the first user and a second percentage of usage associated with the second user; and based on the amount of actual usage of the network enabled property, determining a second adjustable maintenance schedule; and based on the second adjustable maintenance schedule, adjusting the total transfer amount by adjusting the first amount payable by the first user and the second amount payable by the second user based on the respective amount of actual usage by the first and second users, the adjusting comprising:

determining a new automated transfer amount based on an amount of time before an estimated time for maintenance according to the second adjustable maintenance schedule;

setting the first amount, payable by the first user, based on a first percentage of usage associated with the first user; and setting the second amount, payable by the second user, based on a second percentage of usage associated with the second user.

* * * * *